United States Patent [19]

Wolfe

[11] 4,228,457
[45] Oct. 14, 1980

[54] CONSTANT LUMINANCE TINT REFERENCE

[75] Inventor: Paul G. Wolfe, Batavia, N.Y.

[73] Assignee: GTE Products Corporation, Stamford, Conn.

[21] Appl. No.: 56,570

[22] Filed: Jul. 11, 1979

[51] Int. Cl.³ ............................................. H04N 9/52
[52] U.S. Cl. .............................. 358/21 R; 358/21 V; 358/30
[58] Field of Search ............... 358/21 R, 21 V, 28, 358/30

[56] References Cited

U.S. PATENT DOCUMENTS 3,780,218  12/1973  Rennick .................. 358/21 V

Primary Examiner—Robert L. Richardson
Attorney, Agent, or Firm—John A. Odozynski

[57] ABSTRACT

In a VIR-responsive Tint Control system a dematrixing circuit for synthesizing, from the individual chrominance demodulator outputs, a ZERO-COLOR reference signal. The VIR chrominance interval signal and the ZERO-COLOR reference signals are used as input to a feedback loop that also includes the receiver's chrominance subcarrier oscillator. By comparing the VIR chrominance interval signal to the synthesized ZERO-COLOR reference subcarrier oscillator phase errors are corrected by virtue of a single sampling of the VIR signal.

8 Claims, 2 Drawing Figures

CONSTANT LUMINANCE TINT REFERENCE

TECHNICAL FIELD

This invention relates to circuitry for processing television signals and more particularly to a circuit for effecting chrominance Tint Control in response to a Vertical Interval Reference (VIR) signal.

BACKGROUND ART

As is well known to those skilled in the design of color television receivers, the VIR signal, transmitted during the 19th line of each vertical frame, provides a useful means of correcting, both at the transmitter and within the receiver itself, errors in both the saturation and tint of the demodulated color signal. Although an elaboration on the exact composition of the VIR signal has been presented elsewhere (See, inter alia, U.S. Pat. No. 3,950,780 entitled "VIR Chroma System" to Harry T. Freestone) and is not necessary for an understanding of the subject invention, it suffices to note that the VIR signal includes separate chrominance reference, luminance reference and black level reference components. In addition, the chrominance reference component is characterized by the same phase angle as the color burst signal so that, given a properly phased 3.58 MHz subcarrier oscillator in the receiver, the R-Y and B-Y components of the chrominance reference signal will have quadrature (90°) and a 180° relationships to the reference oscillator, respectively. With this in mind, it can be seen that tint correction can be achieved by sampling the (R-Y) output of the chrominance demodulator during the chrominance reference interval.

The (R-Y) output during the chrominance reference interval is sampled and compared to a ZERO-COLOR reference signal, that is, the (R-Y) output during any time in which there is no chrominance information in the VIR signal, for example, during the black level reference interval. (The Freestone patent cited above describes such a system.) The voltage at the R-Y of the demodulator during the black level reference interval (or during the reception of any other ZERO-COLOR reference signal) will correspond to its quiescent level and should be equal, to the extent that the subcarrier oscillator is properly phased, to the voltage at that output during the chrominance reference interval. Consequently, these outputs, occuring at two different times, can be sampled and stored and used as inputs to a feedback loop that includes the subcarrier oscillator. In short, a difference in the two voltages results in an error correction voltage that controls the phase of the subcarrier oscillator in a manner that tends to reduce the difference to zero, thereby assuring proper phasing of the oscillator.

Although the system as described above is effective, its attractiveness is mitigated by the need for two time gates, one during the VIR chrominance reference interval and one during, for example, the black level reference interval. Other systems attempting to circumvent this requirement have used a fixed "ZERO-COLOR" reference signal that approximates the (R-Y) output of the demodulator during times when no chrominance information is present. However, although this system requires only one time gate, the desired "ZERO-COLOR" reference level depends on, and therefore must be adjusted to, the demodulator. Further, the reference level can be expected to be temperature dependent, with the dependence differing among particular demodulators.

Accordingly, what is desired and attained in this invention is a VIR Tint Control circuit affording not only reduced cost and complexity but also performance features associated with optional Tint Control.

DISCLOSURE OF THE INVENTION

The invention is an improved VIR-responsive tint control circuit that comprises dematrixing means for synthesizing a ZERO-COLOR reference signal from the chrominance demodulator outputs.

The improvement eliminates the additional circuitry required for conventional systems in order to sample and store the black level reference component of the VIR signal (or some other ZERO-COLOR reference). In addition, the ZERO-COLOR reference signal so synthesized is responsive to all three demodulator outputs and therefore reflects shifts in their quiescent output levels.

BEST MODE FOR CARRYING OUT THE INVENTION

For a better understanding of the present invention together with other and furthere objects, advantages and capabilities thereof, reference is made to the following disclosure and appended claims in connection with the above-described drawings.

Figure 1:
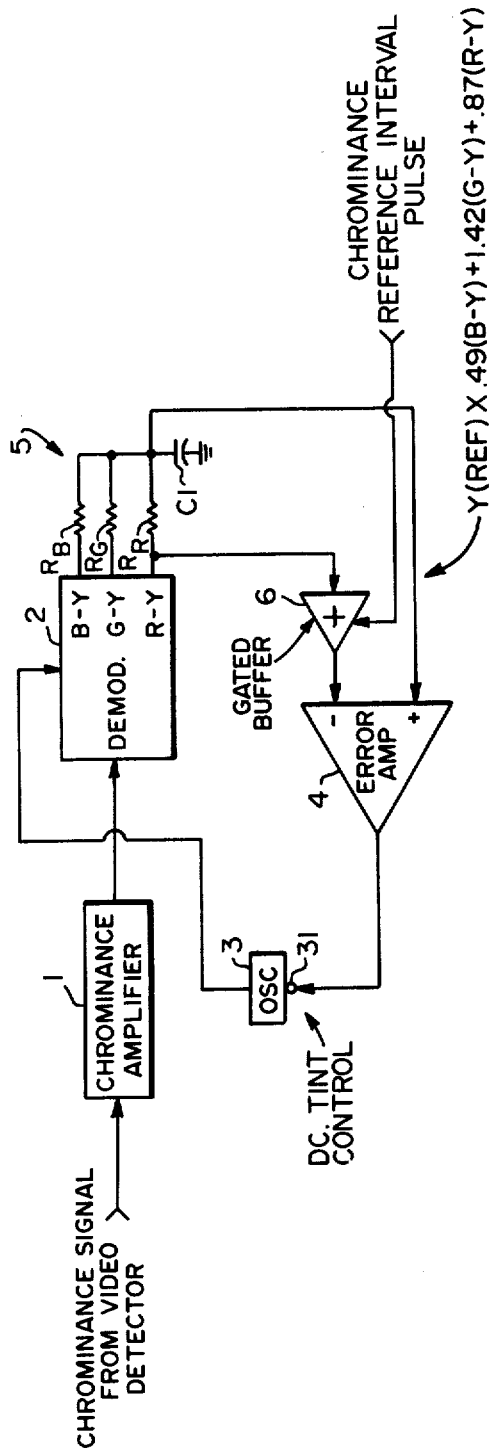
FIG. 1 is a schematic diagram of the subject invention.

Referring now to FIG. 1, the demodulated chrominance signal is coupled from the video detector to the inputs of a chrominance amplifier 1. The chrominance signal is appropriately amplified and filtered and coupled to an input of a chrominance demodulator 2 having outputs representing the respective B-Y, G-Y and R-Y components of the chrominance signal. As is well known, the instantaneous amplitudes of these components depend on the phase relationship between the chrominance signal and the output of the chrominance subcarrier oscillator 3. The phase of the subcarrier oscillator is established by the DC Tint Control voltage applied to terminal 31.

Figure 2:
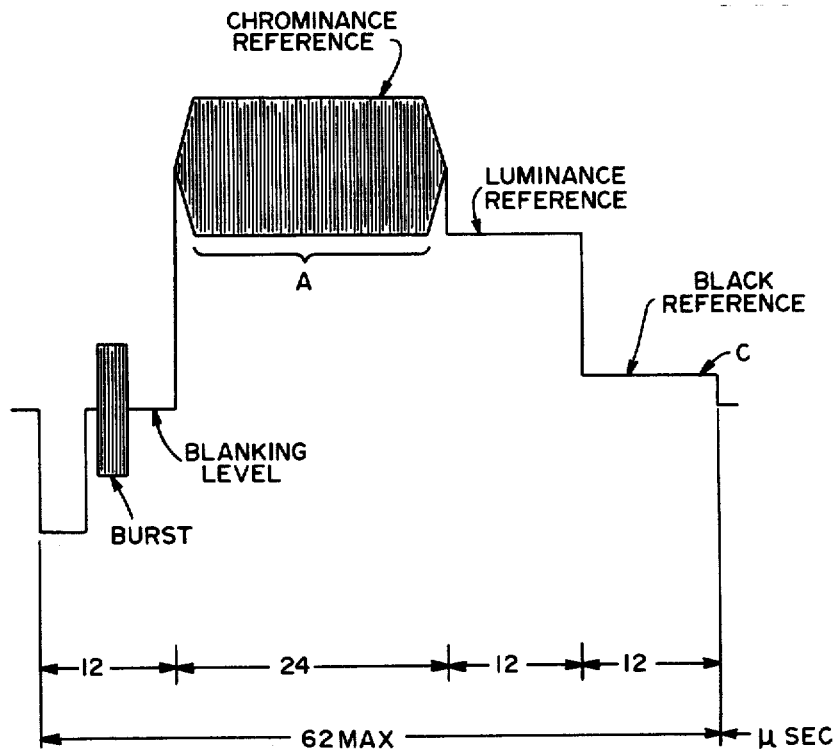
FIG. 2 is a representation of a standard VIR test signal, showing the chrominance, luminance and black level reference components.

In a conventional VIR Tint Control system, the DC Tint Control voltage is developed by comparing, in an error amplifier such as amplifier 4, the R-Y output of the demodulator during the chrominance reference interval to a ZERO-COLOR reference signal, such as the black level reference component of the VIR signal. The error amplifier develops a DC voltage at its output and that voltage is applied to the Tint Color terminal of the subcarrier oscillator so as to substantially maintain equality between the signal levels applied to each of the inputs of the error amplifier. The composition of VIR reference signal is shown in FIG. 2 and the design and operation of a convention VIR Tint Control system are described in the August and September 1976 issues of Electronic Technician/Dealer, on pages 14–21 and 20–29, respectively.

In a manner to be presently described, the subject invention avoids much of the complex circuitry characteristic of such systems by synthesizing, from the individual demodulator outputs, a ZERO-COLOR reference signal, Y. When synthesized in the manner described herein, the Y signal will contain no chrominance information, regardless of the signal received. This is accomplished by dematrixing means 5, comprising resistors R1, R2 and R3 each having one end respectively coupled to the (B-Y), (G-Y) and (R-Y) output of the demodulator and other ends coupled in common to an input (+) of the error amplifier. The values of these resistors are chosen so that the synthesized Y signal is closely equal to 0.49(B-Y)+1.42(G-Y)+0.87(R-Y). Those familiar with the NTSC system of color transmission will recognize that a signal so synthesized will contain no color information and that therefore the voltage at the (+) input of the error amplifier will be representative of the DC or quiescent outputs of the demodulator. Assuming a very high impedance at the input of the error amplifies standard values of 150 K ohm, 22 K ohm and 82 K ohm for R1, R2 and R3, respectively, provide and affective ZERO-COLOR reference signal as defined above. Capacitor C1, connected between the common junction of R1, R2 and R3 and ground operates to filter out errors that might occur during the demodulation process.

With the recognition that a ZERO-COLOR reference signal may be obtained by virtue of a dematrixing means as just described, VIR Tint Control may be more or less conventionally achieved as follows. The R-Y output of the demodulator is coupled to an input of a gated buffer 6 so that it appears at another, (−), input of the error amplifier only during the chrominance reference interval (See FIG. 2) of the VIR signal. This is accomplished by developing a Chrominance Reference Interval Pulse as described, for example, in the article cited above and coupling this pulse to an enabling input of the gated buffer as shown in FIG. 1. In this manner the chrominance reference signal can be compared to the ZERO-COLOR reference and the difference between the two can be used to develop a DC Tint Control voltage to assure proper phasing of the subcarrier oscillator.

In addition to avoiding the complex circuitry required when VIR Tint Control is achieved by sampling the black level reference signal, the subject invention also represents an improvement over the prior art in that the ZERO-COLOR reference is synthesized from all three demodulator outputs and is thereby responsive to and compensates for drifts in quiescent levels of all three outputs. Conventional VIR Tint Control circuits are typically responsive to only the (R-Y) demodulator output.

Finally, while the dematrixing of the demodulator outputs in order to achieve a ZERO-COLOR reference has been described in the context of the NTSC system, it is understood that this invention contemplates modification, obvious to those skilled in the art, appropriate for use in other color reproduction systems. Such modifications will require only selecting the desired values for R1, R2 and R3.

Accordingly, while there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

This invention is useful in color television receivers that use the VIR signal in order to achieve proper Tint Control.

I claim:

1. In a VIR-responsive tint control circuit that effects accurate phasing of the chrominance subcarrier oscillator by comparing one output of the chrominance demodulator during the chrominance reference portion of the VIR signal to a ZERO-COLOR reference signal indicative of an absence of color information, the improvement comprising:
dematrixing means for synthesizing from the chrominance demodulator outputs an appropriate ZERO-COLOR reference signal whereby only one sampling of the VIR signal need be taken in order to effect desired tint control.

2. An improvement as defined in claim 1 above wherein said dematrixing means comprises:
a first resistance having one end coupled to the B-Y output of the chrominance demodulator;
a second resistance having one end coupled to the G-Y output of the chrominance demodulator;
a third resistance having one end coupled to the R-Y output of the chrominance demodulator, said resistance having respective other ends connected to a common junction.

3. An improvement as defined in claim 2 wherein said dematrixing means further comprises a capacitance connected between the common junction and a reference potential for filtering from the ZERO-COLOR reference signal errors resulting from inaccuracies in the color demodulation process.

4. An improvement as defined in either claim 2 or claim 3 wherein said first, second and third resistances are so arranged and constructed that the ZERO-COLOR reference signal is approximately equal to $0.49(E_{B-Y})+1.42(E_{G-Y})+0.87(E_{R-Y})$ where $(E_{G-Y})$ and $(E_{R-Y})$ are the respective signals at the (B-Y), (G-Y) and (R-Y) outputs of the chrominance demodulator.

5. A VIR-responsive tint control circuit comprising:
a demodulator for demodulating the chrominance signal and providing separate (B-Y), (G-Y) and (R-Y) outputs,
a subcarrier oscillator having an output coupled to the demodulator and a Tint Control terminal;
dematrixing means having an input coupled to the demodulator outputs for synthesizing a ZERO-COLOR reference signal;
a gated buffer having a signal input coupled to the (R-Y) output of the demodulator and an enabling input coupled to a source of chrominance reference interval pulses, and
an error amplifier having a first input coupled to the output of the gated buffer, a second input coupled to the dematrixing means and an output coupled to the Tint Control terminal for developing a Tint Control signal in response to the difference between the (R-Y) output of the demodulator during the chrominance reference interval of the VIR signal and the ZERO-COLOR reference signal.

6. A circuit as defined in claim 5 wherein the dematrixing means compares first, second and third resistances each respectively coupled at one end to the (B-Y), (G-Y) and (R-Y) demodulator outputs and coupled in common at another end to the second input of the error amplifier.

7. A circuit as defined in claim 6 where the resistances are so arranged and constructed that the ZERO-COLOR reference signal is approximately equal to $0.49(E_{B-Y})+1.42(E_{G-Y})+0.87(E_{R-Y})$, where $(E_{B-Y})$, $(E_{G-Y})$ and $(E_{R-Y})$ are the respective signals at the (B-Y), (G-Y) and (R-Y) outputs of the chrominance demodulator.

8. A circuit as defined in claim 7 wherein the dematrixing means further comprises a capacitance coupled between the second input of the error amplifier and a reference potential.

* * * * *